United States Patent [19]
Bell

[11] Patent Number: 4,986,234

[45] Date of Patent: Jan. 22, 1991

[54] POLYMETALLIC PISTON-CYLINDER CONFIGURATION FOR INTERNAL COMBUSTION ENGINES

[75] Inventor: James A. E. Bell, Oakville, Canada

[73] Assignee: Inco Limited, Canada

[21] Appl. No.: 429,388

[22] Filed: Oct. 31, 1989

[51] Int. Cl.[5] .......................... F02F 3/00; B32B 15/00

[52] U.S. Cl. .............................. 123/193 CP; 92/227; 123/193 C; 123/193 P

[58] Field of Search ......... 123/193 P, 193 CP, 193 C, 123/193 CH; 92/222, 223, 224, 225, 227, 169.2

[56] References Cited

U.S. PATENT DOCUMENTS

| | | | |
|---|---|---|---|
| 1,478,561 | 12/1923 | Faessel | 92/225 |
| 2,261,405 | 11/1941 | Nicolle | 92/227 |
| 3,391,613 | 7/1968 | Hocke | 92/227 |
| 4,466,399 | 8/1984 | Hinz et al. | 123/193 CP |
| 4,495,907 | 1/1985 | Kamo | 123/193 C |
| 4,535,683 | 8/1985 | Dworak et al. | 92/222 |
| 4,852,542 | 8/1989 | Kamo et al. | 123/193 CH |

*Primary Examiner*—Andrew M. Dolinar
*Assistant Examiner*—M. Macy
*Attorney, Agent, or Firm*—Francis J. Mulligan, Jr.; Edward A. Steen

[57] ABSTRACT

A piston-cylinder combination for internal combustion engines made from a varying bonded combination of two or more alloys having dissimilar coefficients of thermal expansion. By regulating the volumetric percentages of the alloys vis-a-vis their location within the piston and cylinder wall, the degree of thermal expansion experienced during operation may be controlled. The concept is especially useful for low heat rejection engines.

6 Claims, 2 Drawing Sheets

POLYMETALLIC PISTON-CYLINDER CONFIGURATION FOR INTERNAL COMBUSTION ENGINES

TECHNICAL FIELD

The instant invention is directed towards internal combustion engines in general, and more particularly, to the metallurgical components of the pistons and cylinders therein.

BACKGROUND ART

Throughout their history, attempts have been made to increase the efficiency of internal combustion engines. Although alternative and improved designs have been proposed, it is generally conceded that the spark ignition and diesel designs will still be the engines of choice for most ground and marine based systems.

Mass produced engines have relatively mediocre efficiency ratings—about 35–40%. The great bulk of these inefficiencies may be traced to wasted heat. Accordingly, some engine research has been directed toward harnessing heat otherwise lost to the block, coolant, radiator, exhaust system and ultimately to the environment.

One line of research has been the attempt to formalize low heat rejection engines (commonly but imprecisely called adiabatic engines). Although simple in theory—the "waste" heat is captured and converted to additional work—the practice has proven difficult. The major stumbling block has been the temperature limits of the engine component materials. Common materials such as cast iron, aluminum alloys, and many stainless steels cannot withstand the rigors of the higher engine temperatures contemplated with the newer designs. Ceramics and composites are brittle and are difficult to fashion into the appropriate shapes.

A novel compounded overcharged engine has been proposed in Canadian patent application filed on Sept. 12, 1989. A low heat rejection embodiment is discussed in this application.

SUMMARY OF THE INVENTION

This invention relates to material selection for low heat rejection engines although it may also be applied to conventional engines. Controlled volumetric coefficient of thermal expansion alloys are bonded together to variably line the piston and cylinder walls of an engine. By insulating these components, engine efficiencies are substantially increased and conventional cooling systems may be eliminated.

PREFERRED EMBODIMENT OF THE INVENTION

The instant invention relates to low heat rejection engines ("LHRE's"). In particular, insulated metallic components with controlled thermal expansion characteristics are employed.

Figure 1:
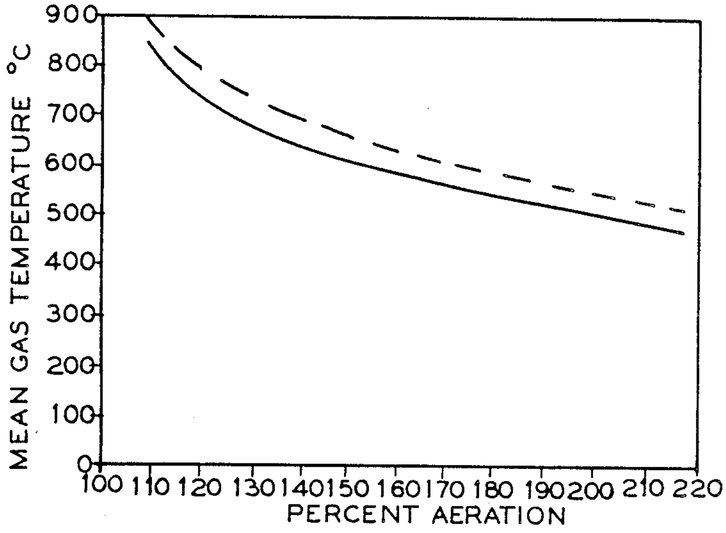
FIG. 1 is a graph plotting mean gas temperature and percent aeration.

An important aspect of material selection for LHRE's is the service temperature. If a metallic engine is fully insulated then the average temperature of hot components will be substantially equal to the mean gas temperature contacting that component. For example, the average gas temperature cycle of a fully insulated overcharged crossover engine designed in accordance with the teachings of the aforementioned Canadian patent application Ser. No. 611,038 operating at 218% aeration has been calculated to be about 485° C. (931° F.). The mean gas temperature or mean piston crown or head temperatures of insulated engines, function of percent aeration, can be shown in graphic form. See FIG. 1, solid line. Turbocharging or overcharging the engine raises the average gas temperature by about 63° C. (171° F.) throughout the spectrum. See FIG. 1, dashed line. Intercooling the charge reduces the temperature increase. Accordingly, a major control of the mean gas temperature is the percent aeration allowed in the engine.

For normal commercial engines, the aeration should not be allowed to drop under 150% because the smoke limit is approached too closely and the efficiency of the engine badly deteriorates. For the purpose of a non-limiting example an overcharged crossover engine running at 218% aeration will be discussed.

Figure 2:
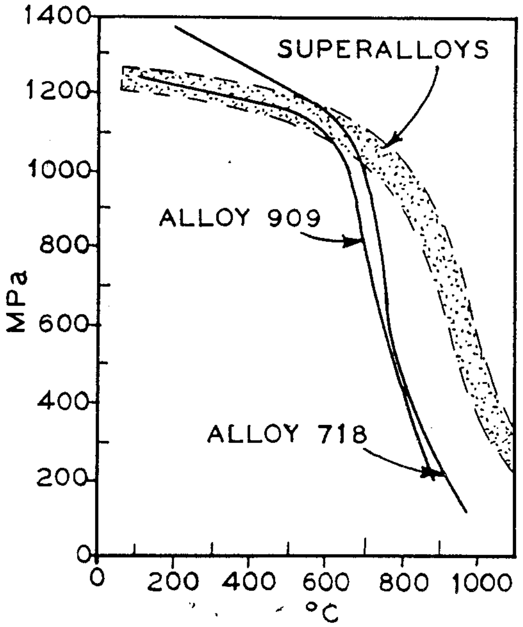
FIG. 2 is s tensile strength curve for several alloys.

The mean temperature or the piston crown temperature on engine head will be 485° C. The strength of some conventional super-alloys is shown in FIG. 2 as a function of temperature. In particular, INCOLOY® alloy 909 is a nickel-iron-cobalt high strength, low coefficient of expansion alloy having a constant modulus of elasticity. The alloy is strengthened by precipitation hardening heat treatments by virtue of additional niobium and titanium. It is particularly useful where close control of clearances and tolerances are required. Examples include gas turbine vanes, casings, shafts and shrouds. Since alloy 909 does not contain chromium, it is generally not exposed to corrosive environments.

The nominal composition of alloy 909 is as follows (in weight percent):

| | |
|---|---|
| Nickel | 38 |
| Cobalt | 13 |
| Iron | 42 |
| Niobium | 4.7 |
| Titanium | 1.5 |
| Silicon | 0.4 |

INCONEL® alloy 718 is a workhorse superalloy. It is a high strength, corrosion resistant material that will retain its desirable properties up to about 980° C. (1800° F.). Accordingly, it is frequently used in the hot sections of gas turbine engines, rocket motors, nuclear reactors and hot extrusion tooling.

The nominal composition of alloy 718 is given below (in weight percent):

| | |
|---|---|
| Nickel | 52.5 |
| Chromium | 19 |
| Iron | Balance |
| Niobium (+ Tantalum) | 5.1 |
| Molybdenum | 3 |
| Titanium | 1 |
| Aluminum | 0.6 |
| Cobalt | 1.00 |

As can be noted in FIG. 2 at temperature under 700° C. the alloys shown have excellent strength.

Figure 3:
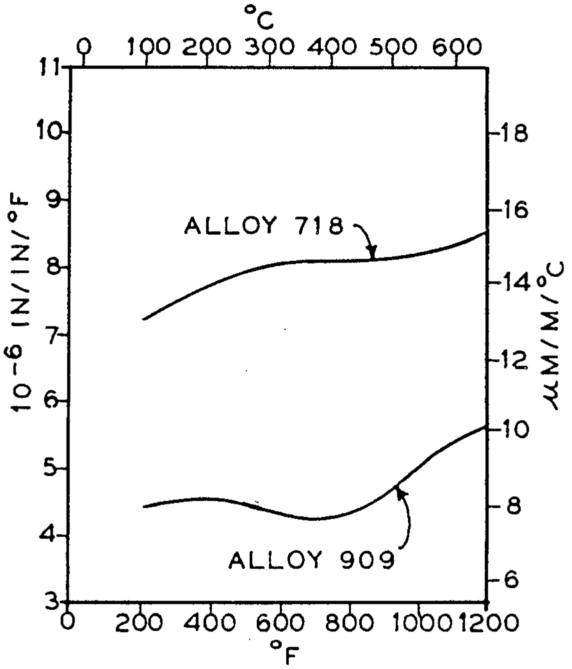
FIG. 3 shows the thermal coefficient of expansion for two alloys.

The thermal coefficients of expansion for alloys 718 and are shown in FIG. 3.

Figure 4:
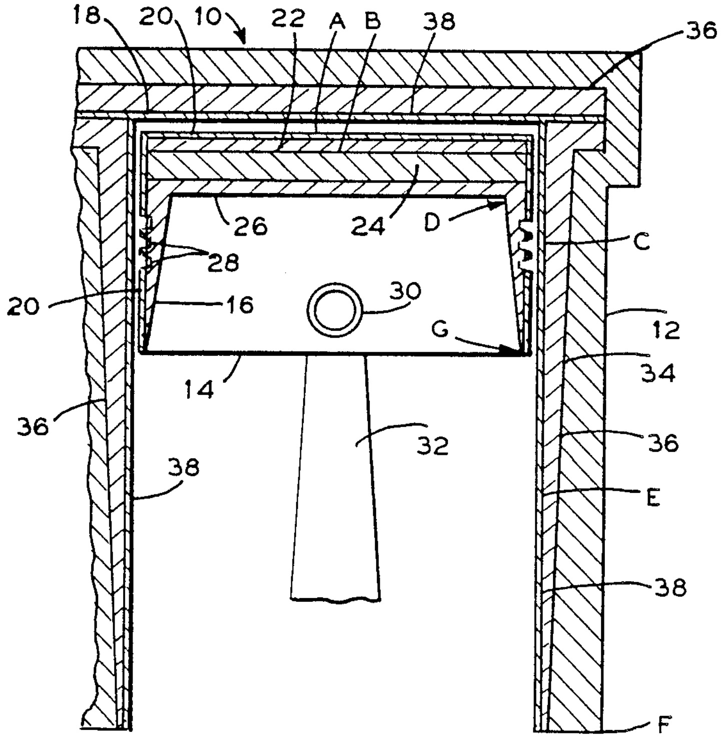
FIG. 4 is s view, in partial cross section, of an embodiment of the invention.

A preferred embodiment of the invention is shown in FIG. 4. A piston-cylinder combination 10 is substantially enveloped by an insulator 12, such as a zirconia refractory.

A composite piston 14 is disposed within a composite cylinder 34. The radius of the cylinder 34 may be, for example, about 3 inches (76.2 mm).

The piston 14 consists of a skirt 16 of varying dimension and alloy composition. The crown 18 of the piston 14 consists of a layer 20 of alloy 718 over a layer 22 of alloy 909. An insulating disc 24, such as zirconia refractory, may be sandwiched between the upper 909 layer 22 and the body 26 of the piston 14 which is also comprised of alloy 909. The 718 layer 20 extends downwardly along the skirt 16. The skirt 16 varies in dimension towards the distal end (away from the crown 18).

A plurality of piston ring grooves 28 circumscribe the skirt 16. A pin 30, preferably made from alloy 718, is connected in a standard manner to connecting rod 32, which may be made from a suitable aluminum alloy.

The cylinder 34 consists of a frustoconical jacket 36 of alloy 909 circumscribing a tube 38 of alloy 718.

Both the piston 14 and the cylinder 34 utilize a variable wall thickness of alloy 909 (22 and 36) bonded to a thin layer 20 or tube 38 of alloy 718. The key to the invention is that since the two alloys are initially bonded together and constrained to expand in a particular direction, in this case a hoop, and the alloys have a similar strength and modulus as a function of temperature, the coefficient of thermal expansion ("CTE") will be the volumetric average of the amount of alloys 718 and 909 at the point of measurement.

The juxtaposition of the two alloys produces a cylinder 34 wall which has a lower CTE at the upper part of the wall while the lower portion of the cylinder 34 has a higher CTE. The rationale for this construction is to achieve a cylinder wall, which when placed in an engine and fully insulated, maintains a straight bore both at ambient temperatures and at high operating temperatures.

The piston 14 is designed in the same fashion with the upper portion of the piston 14 having the lower CTE and the lower portion of the piston 14 having the higher CTE. The crown 18 is alloy 909 with a thin layer 20 of alloy 718 followed by the insulator 24. The crown 18 is machined so that the diameter of the crown 18 is several thousands of an inch (mm) smaller than the diameter of the upper piston ring. The lower part of the piston 14 from the top ring to the bottom of the skirt 16 is graded with alloys 909 and 718 as shown in FIG. 4.

The table below correlates the temperature at various locations in the piston-cylinder system 10 with the gradations of alloy 909/718, and their respective CTE's and calculated expansions. The letters A-G, identifying the locations, are found in FIG. 4.

Locations A and B are above the top piston ring reversal point and the wall of the cylinder 34 need not stay true above these locations. Essentially it is only where the piston rings sweep the wall of cylinder that the cylinder 34 diameter must be kept constant.

| Location | Temperature, °C. | Volumetric Percent 909/718 | CTE ppm/°C. | Expansion from Cold Thousands Inches | (mm) |
|---|---|---|---|---|---|
| A | 485 | 92/8 | 8.5 | 9.6 | (0.24) |
| B | 400 | 92/8 | 8.5 | 9.6 | (0.24) |
| C | 350 | 83/17 | 9.0 | 8.8 | (0.22) |
| D | 290 | 50/50 | 11 | 8.8 | (0.22) |
| E | 290 | 50/50 | 11 | 8.8 | (0.22) |
| F | 250 | 17/83 | 13 | 8.8 | (0.22) |
| G | 250 | 17/83 | 13 | 8.8 | (0.22) |

The instant invention has thus overcome the major design problem with high temperature or low heat rejection engines, namely, it is not possible to design a piston head or a cylinder wall from a monolithic material in an engine where the cylinder wall will vary from 485° C. to 250° C. without allowing such large clearances between the piston and the cylinder wall that the rings would be unable to seal.

In a water cooled engine this problem does not exist. The cast iron cylinder wall surface temperatures are maintained at 140° C. both at the top and bottom by the coolant. The temperature of the cast iron piston at the top ring would be 215° C. Thus, the clearance when cold (25° C.) at the upper ring would be machined to be 0.003 inch (0.08 mm) and the hot clearance would then be for a 6 inch (152 mm) diameter piston.

$$0.003 - (215 - 25) \times 12 \times 10^{-6} \times 3'' + (140 - 25) \times 12 \times 10^{-6} \times 3'' \text{ or } 0.003 - 0.0068 + .0041 = 0.00034 \text{ inches } (.0086 \text{ mm})$$

However, if the same engine was designed without cooling from a monolithic material like alloy 909, the temperature would rise to those shown in the Table. Accordingly, the piston at the upper ring should be machined so that when the upper gap would be 0.0034 inches (0.086 mm) larger than the zero gap at the bottom, that is, the rings would have to accommodate .0025 inches (0.0635 mm) more expansion at the top of the stroke to the bottom. This is a difficult undertaking since most engines are remachined when the wall is worn by 2 thousands of an inch (0.051 mm).

Note that by employing the instant invention, the clearance desired can be set at any practical value (0.0005 to 0.001 inches [0.013–0.025 mm]) and the same clearance will be maintained at hot conditions to cold conditions and top of stroke to bottom of stroke. By the same token, since the rates of expansion and the clearances may be controlled, ringless pistons may be inserted into the cylinders.

At each location, say C, the cylinder 34 wall thickness is variably sized so that it is comprised of 92% (by volume) alloy 909 and 8% (by volume) alloy 718. It can be shown that the CTE for this combination is 9.0 ppm/° C. As one travels downwardly, say to location F, the volumetric percentages have shifted to 17% alloy 909 and 83% alloy 718. This combination has a higher CTE due to the increased prominence of alloy 718. Other combinations of two or more alloys may be employed to similar advantage.

It may be appreciated that the thickness of the cylinder jacket 36 is greater at the top than at the bottom. This is desirable since the highest pressures are found in the upper portion of the cylinder 34.

The combination of the two alloys is essentially a function of the expected volumetric expansion of the piston and the cylinder. Since the engine is preferably insulated, by initially selecting a fixed thickness of alloy 718, the alloy 909 constituent may be varied to maintain the average coefficient of expansion of the piston-cylinder combination 10 essentially constant. In this fashion, the expansion due to the heat is kept within the desired range.

The manufacture of the piston 14 and the cylinder 34 is within the competence of the artisan. Production can be accomplished by coextruding the alloys 718 and 909, chill casting alloy 909 around alloy 718 or shrink fitting and diffusion bonding the alloys together.

The example used above maintained the aeration at 218%. In this condition at the top ring reversal point the cylinder wall was 350° C. (location C), below the maximum of 375° C. for high temperature liquid lubricants. Thus, no design changes in the lubrication system would be required. If lower aerations are desired (which give higher mean gas temperatures) in the engine then the top ring reversal temperature can be held to 350° C. by cooling the lubricant on the inside of the piston. This would give a small penalty in the engine efficiency but a gain in specific power of the engine. The piston can also be extended and the rings lowered on the piston so that they only contact the cooler lower wall. This has a detriment of creating a deeper engine.

Another embodiment of the design is that with the use of a controlled expansion alloy like alloy 909, an air plasma sprayed partially stabilized zirconia coating may be applied to the crown of the piston or the engine head. The CTE of alloy 909 and the partially stabilized zirconia are the same so a long life is obtained as revealed in U.S. Pat. No. 4,900,640.

In view of the above, the engine in accordance with the principles set forth would not have to be cooled. The superalloys used in the engine would be more expensive than existing cast iron or aluminum but a major weight saving would accrue because no conventional engine block is required. Without the need for conventional engine block water cooling, the associated accoutrements-radiator, fan, pump, water passages, hoses, etc. may be eliminated. Instead, an open frame construction supporting the insulated cylinders, valves, crank shaft, fuel delivery system, etc. would replace the bulky solid engine block. The weight of the superalloy components would also be lowered by making use of their much higher strength characteristics, i.e. 180,000 pounds per square inch (1241 MPa) ultimate tensile strength compared to 30,000 to 40,000 pounds per square inch (207-276 MPa) for cast aluminum or cast iron parts.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A piston and cylinder combination for internal combustion engines, the combination comprising a cylinder and a piston disposed therein, the cylinder and piston having compositions of at least two alloys with different coefficients of thermal expansion gradually decreasing from one having a substantial percentage of a lower coefficient of expansion alloy to one having a substantial percentage of a higher coefficient of expansion alloy, the volumetric percentage of the alloys maintaining a substantially straight cylinder bore and piston side over an ambient to operating temperature range.

2. The combination according to claim 1 wherein a lower coefficient of expansion alloy is alloy 909.

3. The combination according to claim wherein a higher coefficient of expansion alloy is alloy 718.

4. The combination according to claim 1 wherein the engine is a low heat rejection engine.

5. The combination according to claim 1 wherein the engine is compounded and overcharged.

6. The combination according to claim 1 wherein the alloys are bonded together.

* * * * *